US012700188B2

(12) United States Patent
Yang et al.

(10) Patent No.: US 12,700,188 B2
(45) Date of Patent: Aug. 4, 2026

(54) METHOD AND DEVICE FOR RENDERING CONTENT IN MOBILE COMMUNICATION SYSTEM

(71) Applicant: SAMSUNG ELECTRONICS CO., LTD., Suwon-si (KR)

(72) Inventors: Hyunkoo Yang, Suwon-si (KR); Eric Yip, Suwon-si (KR); Jaeyeon Song, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 127 days.

(21) Appl. No.: 18/248,225

(22) PCT Filed: Oct. 7, 2021

(86) PCT No.: PCT/KR2021/013776
§ 371 (c)(1),
(2) Date: Apr. 6, 2023

(87) PCT Pub. No.: WO2022/075767
PCT Pub. Date: Apr. 14, 2022

(65) Prior Publication Data
US 2023/0410443 A1     Dec. 21, 2023

(30) Foreign Application Priority Data
Oct. 7, 2020     (KR) ........................ 10-2020-0129669

(51) Int. Cl.
G06T 19/00      (2011.01)
G06T 7/60       (2017.01)
H04L 65/1069    (2022.01)

(52) U.S. Cl.
CPC .............. G06T 19/006 (2013.01); G06T 7/60 (2013.01); G06T 2207/10016 (2013.01); H04L 65/1069 (2013.01)

(58) Field of Classification Search
None
See application file for complete search history.

(56) References Cited

U.S. PATENT DOCUMENTS 9,377,858  B2    6/2016   Kim et al.
10,453,273 B2    10/2019  Perez et al.
(Continued)

FOREIGN PATENT DOCUMENTS

CN     107330850 A    11/2017
EP       3413166 A1    12/2018
(Continued)

OTHER PUBLICATIONS

Altanai, "WebRTC Media Streams and Quality Metrics", 2014, retrieved from "https://telecom.altanai.com/2014/10/04/webrtc-media-streams/" (Year: 2014).*
(Continued)

*Primary Examiner* — Michael J Cobb

(57) ABSTRACT
The present disclosure relates to a communication technique for converging IoT technology with a 5G communication system for supporting a higher data transmission rate beyond a 4G system, and a system therefor. The present disclosure may be applied to an intelligent service (for example, a smart home, a smart building, a smart city, a smart car or connected car, health care, digital education, retail business, a security and safety-related service, etc.) on the basis of 5G communication technology and IoT-related technology. Disclosed is a method and device for capturing and rendering content in augmented reality (AR).

12 Claims, 9 Drawing Sheets

(56)                 References Cited

U.S. PATENT DOCUMENTS

| | | | | |
|---|---|---|---|---|
| 10,497,180 | B1 * | 12/2019 | Perfilev | ................. H04L 67/131 |
| 2010/0066804 | A1 * | 3/2010 | Shoemake | ......... H04N 21/4143 |
| | | | | 348/14.02 |
| 2016/0226938 | A1 * | 8/2016 | Talvensaari | ........ H04N 21/6125 |
| 2017/0053447 | A1 | 2/2017 | Chen et al. | |
| 2018/0043263 | A1 | 2/2018 | Cao | |
| 2018/0077409 | A1 | 3/2018 | Heo et al. | |
| 2019/0065027 | A1 | 2/2019 | Hauenstein et al. | |
| 2020/0143775 | A1 * | 5/2020 | Laaksonen | ............. G09G 5/373 |
| 2020/0213258 | A1 * | 7/2020 | Goenka | ................... H04L 51/42 |
| 2020/0218834 | A1 | 7/2020 | Jovanovic | |
| 2020/0275084 | A1 | 8/2020 | Aizawa | |
| 2020/0344303 | A1 * | 10/2020 | Ljung | ..................... H04L 67/10 |
| 2021/0019453 | A1 * | 1/2021 | Yang | ........................ G06F 30/12 |
| 2022/0028172 | A1 | 1/2022 | Mp et al. | |
| 2023/0059516 | A1 * | 2/2023 | Schwarz | .............. H04N 19/179 |

FOREIGN PATENT DOCUMENTS

| | | | | | |
|---|---|---|---|---|---|
| EP | | 3962075 | A1 * | 3/2022 | ............. G06T 19/00 |
| JP | | 2020-523672 | A | 8/2020 | |
| JP | | 2020-140285 | A | 9/2020 | |
| KR | 10-2016-0086560 | | A | 7/2016 | |
| KR | | 101651568 | B1 | 9/2016 | |
| KR | | 20180028796 | A | 3/2018 | |
| KR | 10-2018-0059285 | | A | 6/2018 | |
| KR | | 20190059727 | A | 5/2019 | |
| KR | 10-2020-0031666 | | A | 3/2020 | |
| KR | 10-2022-0012658 | | A | 2/2022 | |

OTHER PUBLICATIONS

Soumil Srivastava, "WebRTC: Enabling Collaboration Augmented Reality App", 2020, retrieved from "https://arvrjourney.com/webrtc-enabling-collaboration-cebdd4c9ce06" (Year: 2020).*

Radhika Roy, "Handbook of SDP for Multimedia Session Negotiations: SIP and WebRTC IP Telephony", 2018, Chapters 1-16, CRC Press, Taylor and Francis Group ISBN: 978-1-138-48449-8 (Year: 2018).*

Radhika Roy, "Handbook of SDP for Multimedia Session Negotiations: SIP and WebRTC IP Telephony", 2018, Chapters 17-Index, CRC Press, Taylor and Francis Group ISBN: 978-1-138-48449-8 (Year: 2018).*

Supplementary European Search Report dated Feb. 7, 2024, in connection with European Patent Application No. 21878017.9, 9 pages.

International Search Report and Written Opinion of the International Searching Authority dated Jan. 5, 2022, in connection with International Application No. PCT/KR2021/013776, 6 pages.

Office Action issued Aug. 2, 2024, in connection with Korean Patent Application No. 10-2020-0129669, 9 pages.

Office Action issued Feb. 6, 2025, in connection with European Patent Application No. 21 878 017.9, 9 pages.

Office Action issued Apr. 8, 2026, in connection with Chinese Patent Application No. 202180069011.3, 18 pages.

* cited by examiner

METHOD AND DEVICE FOR RENDERING CONTENT IN MOBILE COMMUNICATION SYSTEM

CROSS-REFERENCE TO RELATED APPLICATIONS

This application is a 371 of International Application No. PCT/KR2021/013776 filed on Oct. 7, 2021, which claims priority to Korean Patent Application No. 10-2020-0129669 filed on Oct. 7, 2020, the disclosures of which are herein incorporated by reference in their entirety.

BACKGROUND

1. Field

The disclosure relates to a method and device for capturing and rendering content in augmented reality(AR).

2. Description of Related Art

To meet the increased demand for wireless data traffic since the deployment of 4G communication systems, efforts have been made to develop an improved 5G or pre-5G communication system. Therefore, the 5G or pre-5G communication system is also called a "Beyond 4G Network" or a "Post LTE System". Implementation of the 5G communication system in higher frequency(mmWave) bands (e.g., 60 GHz bands) is being considered in order to accomplish higher data rates. To decrease propagation loss of radio waves and increase the transmission distance in higher frequency bands, beamforming, massive multiple-input multiple-output(MIMO), Full Dimensional MIMO(FD-MIMO), array antenna, analog beam forming, and large scale antenna techniques are being discussed for the 5G communication system. In addition, in the 5G communication system, there are developments underway for system network improvement based on evolved small cells, advanced small cells, cloud Radio Access Networks (cloud RANs), ultra-dense networks, device-to-device(D2D) communication, wireless backhaul, moving network, cooperative communication, Coordinated Multi-Points(CoMP), reception interference cancellation, and the like. In addition, in the 5G system, Hybrid FSK and QAM Modulation (FQAM) and sliding window superposition coding(SWSC) as advanced coding modulation(ACM) and filter bank multi carrier(FBMC), non-orthogonal multiple access(NOMA), and sparse code multiple access(SCMA) as advanced access technology have been developed.

Meanwhile, the Internet, which is a human centered connectivity network where humans generate and consume information, is now evolving into the Internet of Things (IoT) where distributed entities, such as things, exchange and process information. The Internet of Everything(IoE), which is a combination of IoT technology and Big Data processing technology through connection with a cloud server, has emerged. As technology components, such as sensing technology, wired/wireless communication and network infrastructure, service interface technology, and security technology have been demanded for IoT implementation, recently there has been research into a sensor network, Machine-to-Machine(M2M) communication, Machine Type Communication(MTC), and so forth for connecting objects. Such an IoT environment may provide intelligent Internet technology services that create new values for human life by collecting and analyzing data generated among connected things. The IoT may be applied to a variety of fields including smart home, smart building, smart city, smart car or connected car, smart grid, health care, smart appliances, and advanced medical services through convergence and combination between existing Information Technology(IT) and various industrial applications.

In line with these developments, various attempts have been made to apply the 5G communication system to IoT networks. For example, technologies such as a sensor network, Machine-to-Machine(M2M), and Machine Type Communication(MTC) communication may be implemented by beamforming, MIMO, and array antennas of 5G communication techniques. Application of a cloud Radio Access Network(RAN) as the above-described Big Data processing technology may also be considered to be an example of convergence between the 5G technology and the IoT technology.

Meanwhile, as communication technology develops, the demand for providing various devices and eXtended reality (XR) services is increasing. Here, XR may include at least one of virtual reality(VR), augmented reality(AR), or mixed reality(MR). XR services may include, e.g., location-based service applications, XR calls based on XR objects constituted in three dimension(3D), XR streaming, and the like. Here, XR call means a service in which 31) object creation and playback functions are added to general video and audio calls, and XR streaming means a service that allows an XR device to receive XR content from a server and play it.

SUMMARY

AR is a technology that supplements the real world by outputting an AR video, which is a virtual object, to overlap the real world viewed by the eyes of the user. In providing such AR, providing a sense of reality so that the distinction between a real environment and a virtual object represented by an AR video becomes ambiguous may be considered as a major factor. That is, it is necessary to control the movement of the virtual object represented by the AR video so as not to violate the physical laws of the real world.

Accordingly, one object of the disclosure is to provide a method and device for exchanging information on a space in which an AR video is reproduced (output) and information on a space in which an AR video is generated.

In addition, one object of the disclosure is to provide a method and device for appropriately rendering an AR video through exchange of information on each of a reproduction space and a generation space of the AR video.

In order to solve the above problem, a method performed by a user equipment (UE) for rendering content in a mobile communication system, may include obtaining video information on an object; obtaining environment information on a rendering space in which the object is to be output; determining an output state of the object in the rendering space based on a comparison between the video information and the environment information; and rendering the object based on the determined output state.

In addition, a user equipment (UE) for rendering content in a mobile communication system, may include a communication unit; an output unit; and a controller that controls the communication unit to obtain video information on an object; obtains environment information on a rendering space in which the object is to be output; determines an output state of the object in the rendering space based on a comparison between the video information and the environment information; and controls the output unit to render the object based on the determined output state.

According to an embodiment of the disclosure, an AR video is appropriately adjusted and rendered according to the spatial extent of the real world, so that a more realistic AR video can be output without distortion or error of the video.

DETAILED DESCRIPTION

Figure 1A:
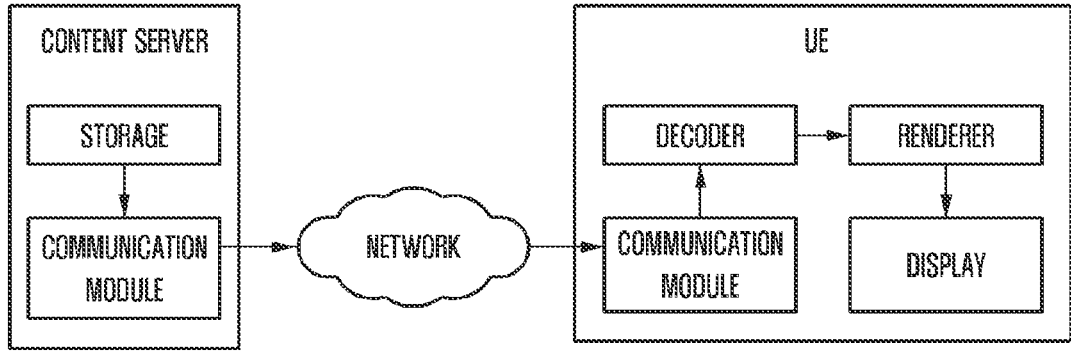
FIG. 1a is a diagram for explaining a technology for providing a 2D video-based service through a content server.

Hereinafter, an embodiment of the disclosure will be described in detail with accompanying drawings. In addition, in the following description of the disclosure, a detailed description of related well-known functions or structures incorporated herein will be omitted when it may make the subject matter of the disclosure rather unclear. The terms which will be described below are terms defined in consideration of the functions in the disclosure, and may be different according to users, intentions of the users, or customs. Therefore, the definitions of the terms should be made based on the contents throughout the specification.

Advantages and features of the disclosure and methods of accomplishing the same will be more readily appreciated by referring to the following description of embodiments and the accompanying drawings. However, the disclosure may be embodied in many different forms and should not be construed as being limited to the embodiments set forth below. Rather, the embodiments are provided so that the disclosure will be made thorough and complete and will fully convey the concept of the disclosure to those of ordinary skill in the art to which the disclosure pertains, and the disclosure will only be defined by the appended claims. Throughout the specification, like reference numerals refer to like elements.

The disclosure may be applied to various devices and eXtended Reality(XR) services. In the disclosure, the XR may mean a technology including at least one of virtual reality(VR), augmented reality(AR), and mixed reality (MR). XR services may include, for example, XR calls based on location-based service applications and three-dimensional(3D) XR objects. XR streaming, or the like XR calls indicate a service in which a function of producing and reproducing 3D objects is added to general video and voice calls, and XR streaming indicates a service in which an XR device receives XR content from a server and reproduces the same.

Devices to which the disclosure can be applied may include any device capable of rendering and outputting content according to a user's pose, or capable of capturing and transmitting content through a network. For example, the disclosure may be applied to a wearable XR device directly or indirectly connected to a network such as AR glasses, an XR teleconferencing device, a capturing device for generating an XR content, a universal terminal capable of providing an XR service, and a network device for providing an XR service. More specifically, as a display and capturing device that renders content according to a user's pose, an AR glasses device including a glasses-type display, video processing function, and communication function may be considered.

For example, an AR glasses device renders received content according to the user's position and gaze, reproduces it on a glasses-type display, and captures and transmits the content using a camera mounted directly or wired or wirelessly connected. Here, depending on service requirements, it is possible that all of the above functions can be performed by an integrated device in the form of eyeglasses, or the above functions can be divided and performed by other devices of the user or a server on a network. In other words, the AR glasses device directly connected to another users or a server through a network can independently support an AR service such as an AR call and an AR streaming. In the case that the requirements for supporting an AR service exceed the computation capability of an AR glasses device, an AR service may be supported by using another device such as a users smartphone, a server on a network, or a combination thereof together with the AR glasses.

As an example, in the case that it is possible to capture 2D and depth videos in an AR glasses device, but it is difficult to generate AR contents through real-time 3D modeling, the captured 2D and depth videos are transmitted to a server on a network, and the server on the network processes the transmitted videos to be provided. For example, the server on the network may perform 3D modeling using the received videos, generate the AR content as a result, and transmit it to the other party's AR device.

As another example, in the case that it is difficult to reproduce AR contents in real time on an AR glasses device, partitioned rendering may be performed with a server on a network, another device such as a user's smartphone, or a combination thereof. As an example of the partitioned rendering task, a server on a network or another device such as a user's smartphone renders AR contents based on view point information of AR glasses, converts the rendered contents into 2D video, transmits the converted contents to the AR glasses, and the AR glasses can correct and reproduce the received 2D video based on information on the user's current viewpoint.

As another example, in the case that an AR glasses device is not a user equipment(UE) connected to a mobile communication network, the AR glasses device is connected to another UE of the user through a device-to-device communication means such as Wi-Fi or Bluetooth, and can be connected to other users or XR content servers through a mobile communication network-connected to the UE.

In addition, as one example, in the case that a device to which the disclosure is applied is a UE, the "UE" refers to a device having a function to transmit or receive data to or from another user's device and a server via a network. For example, the UE may communicate with another UE via a server, and may include a communication module or communication application for communicating with the server or the other UE. As a communication technology available for use in communication between UEs, any one or more of various communication technologies may be used. For example, a UE may communicate with other UEs by using a communication technology that is compliant with the 3rd Generation Partnership Project(3GPP) standards, such as long-term evolution(LTE) or 5G, or a communication technology such as Wi-Fi. A communication technology that may be used for communication between UEs may be variously determined without being limited to the above-described examples.

Figure 1B:
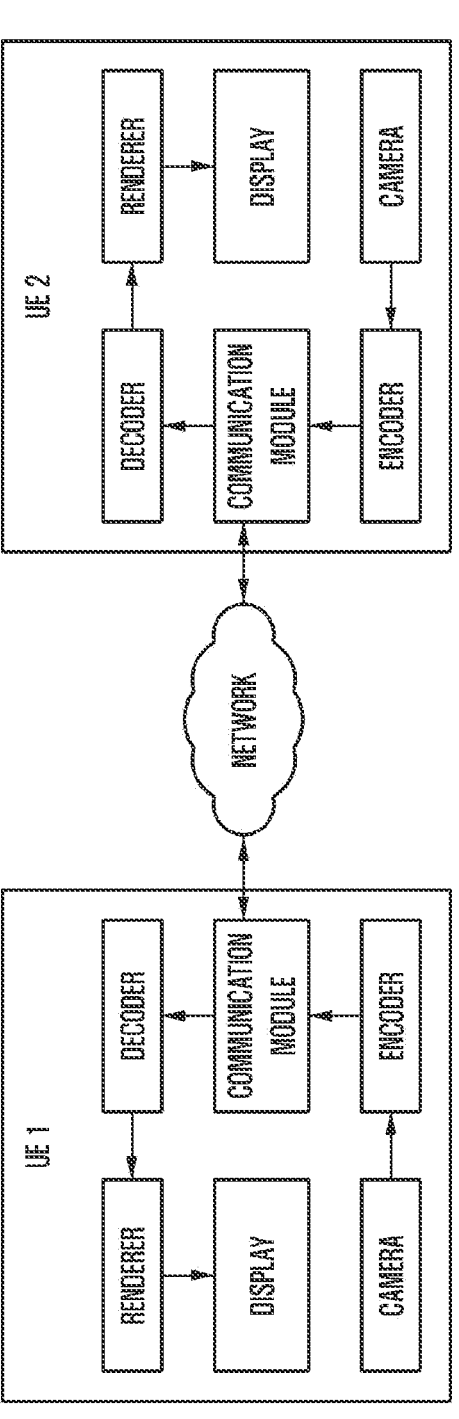
FIG. 1b is a diagram for explaining a technology for providing a 2D video-based service through communication between devices.

FIG. 1a is a diagram for explaining a technology for providing a 2D video-based service through a content server, and FIG. 1b is a diagram for explaining a technology for providing a 2D video-based service through communication between devices.

FIGS. 1a and 1b illustrate examples of functional architecture for a streaming service and a call service based on 2D video, respectively. Here, the streaming service and the call service may be composed of video and audio, but for convenience of description, the following drawings and descriptions will focus on video content.

With reference to FIG. 1a, video media data stored in a storage (memory) of a content server is transferred to a UE through a network. The UE decodes and renders the received video media data to reproduce the data on a display.

With reference to FIG. 1b, in a video call service, UE1 encodes a video captured by a camera and transfers it to UE2, and decodes and renders the video received from UE2 and reproduces it on a display. Similarly, UE2 also encodes the video captured by the camera and transmits it to UE1, and decodes and renders the video received from UE1 and reproduces it on the display. Here, the parameters (e.g., codec, bit rate) for the video transferred by each UE to the other party are negotiated through a separate protocol (e.g., session description protocol(SDP)) prior to initiating a call, and some parameters can be renewed in the middle of a call.

Figure 2A:
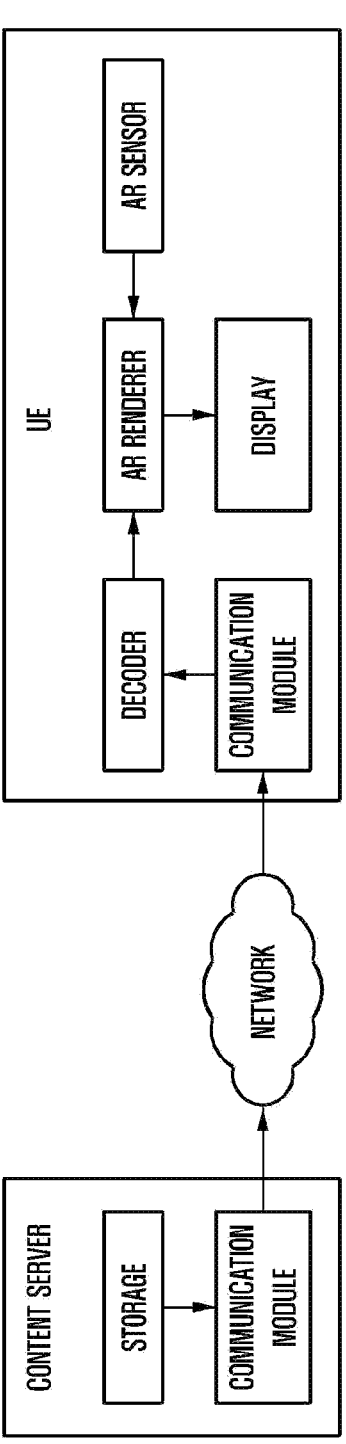
FIG. 2a is a diagram for explaining a technology for providing an AR video-based service through a content server according to an embodiment of the disclosure.
Figure 2B:
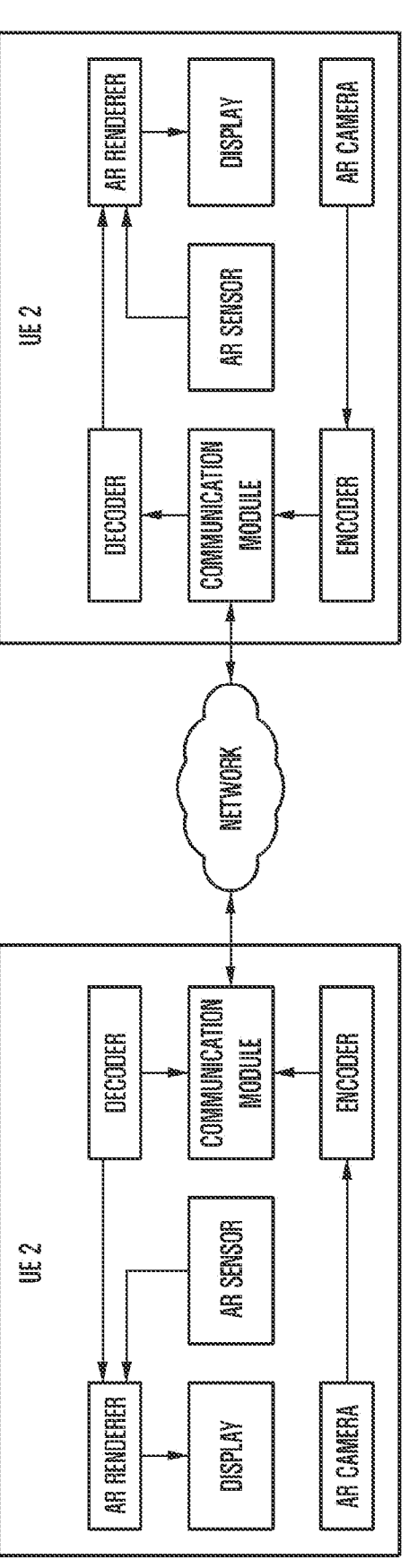
FIG. 2b is a diagram for explaining a technology for providing an AR video-based service through communication between devices according to an embodiment of the disclosure.

FIG. 2a is a diagram for explaining a technology for providing an AR video-based service through a content server according to an embodiment of the disclosure, and FIG. 2b is a diagram for explaining a technology providing an AR video-based service through communication between devices according to an embodiment of the disclosure.

FIGS. 2a and 2b illustrate examples of functional architectures for a streaming service and a call service based on an AR video, respectively. Here, the AR video may be expressed in a format such as a point cloud or a mesh as a stereoscopic image. The AR video-based streaming service and call service may be composed of an AR video, a 2D video, and a voice, but for convenience of description, the following drawings and descriptions will focus on the AR video.

With reference to FIG. 2a, AR video media data stored in the storage (memory) of the content server is transmitted to the UE through a network. The UE decodes and renders the received AR video media data and reproduces the data on a display. Here, the rendering of the AR video may include a process of analyzing the user environment input from an AR sensor and mapping the received AR video to the pixels of the display according to the analyzed user environment and viewpoint. More details will be described later.

With reference to FIG. 2b, in an AR video call service, UE1 encodes an AR video captured by an AR camera and transmits it to UE2, and decodes and renders the AR video received from UE2 and reproduces it on a display. Similarly, UE2 also encodes the AR video captured by an AR camera and transmits it to UE1, decodes and renders the AR video received from UE1, and reproduces it on the display. Here, the AR camera may perform 3D modeling by utilizing depth information of a subject to be captured and output an AR video. More details will be described later.

Parameters (e.g., codec, bit rate) for the AR video transmitted by each UE to the other party are negotiated using a separate protocol (e.g., SDP) before starting a call, just like a normal video call, and some parameters can be renewed in the middle of a call.

Meanwhile, there are factors to be considered when performing rendering in a 3D environment, unlike a 2D environment. For example, if a dancer dancing on a stage is reproduced as an AR video, an empty space having the same width as the stage must exist in the real world so that the dancer represented by the AR video can be rendered as if it exists in the real space. If the empty space in the real world is narrower than the width of the stage, it is necessary to adjust the dancer's movement range or size according to a ratio between the width of the stage and the width of the empty space in the real world before rendering. As another example, considering the case where user A in a conference room and user B in a living room at home are making an AR video call, if information on the size of the conference room and the living room is not shared, when A makes a call while walking around the conference room, from the point of view of B in the living room, which is narrower than the conference room, A may be rendered as if A overlays with the wall of the living room or disappears through the wall. Therefore, in order to realistically render A into B's living room, information on the size of the conference room and the living room is required.

Figure 3:
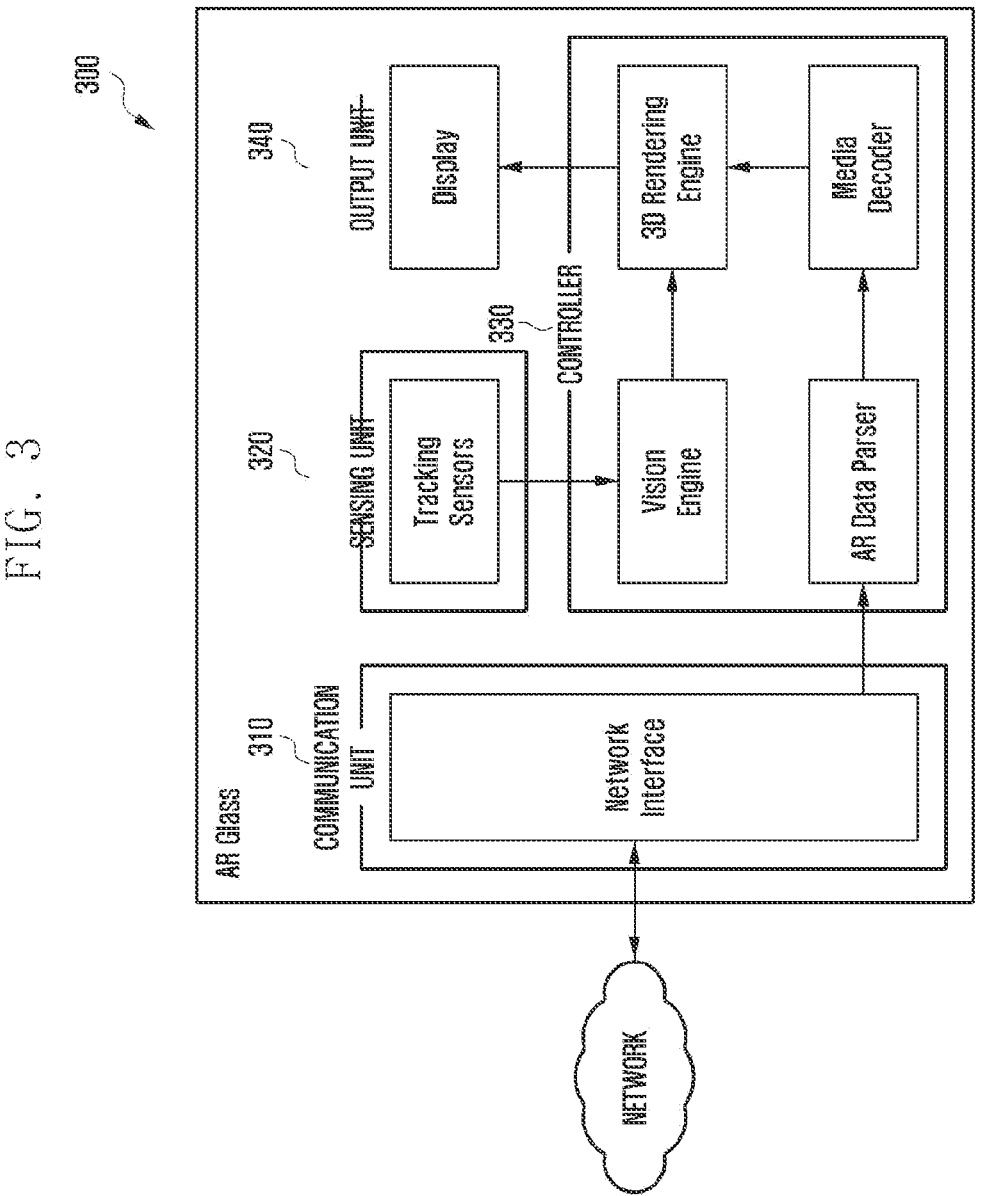
FIG. 3 is a diagram illustrating a functional architecture of a device (e.g., AR glasses) performing rendering according to an embodiment of the disclosure.

FIG. 3 is a diagram illustrating a functional architecture of a device (e.g., AR glasses) performing rendering according to an embodiment of the disclosure. For convenience of description, a device for rendering displays only a portion necessary for reproducing an AR video, but is not limited thereto, and may further include other components that perform other functions. Functions for generating an AR video will be described through the descriptions of a device that performs capturing, which will be described later. For reference, a device including functions for generating AR may further include a camera for generating an AR video in addition to the device according to FIG. 3.

With reference to FIG. 3, a rendering device 300 according to an embodiment of the disclosure may include a communication unit 310, a sensing unit 320, a controller 330, and an output unit 340.

The communication unit 310 may receive data from an external device or a server through a network interface, and the received data may be transferred to the controller 330 to be processed. More specifically, the received data is processed by the AR data parser included in the controller 330 and transmitted to a media decoder suitable for the data format. As an example, in the case that audio data and video data are received through the network interface, the AR data parser classifies the received data and transfers audio data to an audio decoder and video data to a video decoder. In addition, the media decoder included in the controller 330 decodes the transferred media data and transfers it to a 3D rendering engine, and the 3D rendering engine performs rendering based on the decoded media data and information on the user environment transferred from a vision engine, and reproduces a video on a display.

The vision engine obtains information on the user environment extracted by tracking sensors (e.g., cameras, GPS, beacons, direction sensors, etc.) included in the sensing unit 320. As an example of information on the user environment transferred from the vision engine to the 3D rendering engine, there is user pose information indicating the location and viewpoint direction of a user wearing AR glasses. Although not illustrated in FIG. 3, the vision engine and the 3D rendering engine may additionally obtain information necessary for the operation of the vision engine and the 3D rendering engine from a database stored in a terminal or accessible via online, depending on the implementation. For example, in the case that the vision engine detects a desk in a user environment, object information corresponding to the desk as well as video and sensor data obtained from a terminal may be extracted from the database and used. For example, detailed information on the position, size, movement pattern or range of movement of an object, such as the size of a desk and the range of movement of a drawer, may be obtained and used in the rendering process of the received object.

Also, according to an embodiment of the disclosure, a predetermined space related to a user environment may be defined as a reference space for rendering a received object. For example, when rendering a received object as if it actually exists in the user environment, a maximum space in which the receiving object can be displayed in the user environment may be defined as a rendering space. Here, the rendering space may be determined according to the purpose of an AR service as well as physical objects such as walls, chairs, and desks located in the user environment. That is, the rendering space may refer to a space in which motions and movements of a received object in a user environment can be rendered naturally.

For example, in the case that a user wears AR glasses and executes an AR video conference service in a conference room, the rendering space may be the entire interior space of the conference room. As another example, in the case that a user wears AR glasses and executes an AR chess game, the rendering space may be a partial area on a table placed in front of the user.

Meanwhile, the controller 330 of the device 300 according to an embodiment of the disclosure renders the received object as if it actually exists in the user environment, or such that the received object is controlled to be displayed inside a virtual window which occupies all or part of the display like a monitor in a PC environment. Here, the virtual window may be a virtual object in the form of a picture frame or a certain area of a display that can be identified by the user but has no display, and its location may be fixed to a specific location (e.g., a frame above a desk) in the user environment or it can be located at relatively fixed coordinates based on the user's location (e.g., a monitor that follows the user). In this way, in order to render an object received through the AR glasses, environment analysis according to a user's location is essential.

Regarding the rendering method, a rendering window may be defined according to an embodiment of the disclosure. As described above, the AR glasses can display a received object inside a virtual window, and here, the virtual window may be defined as a rendering window. Here, the rendering window may be regarded as a kind of window through which a wider rendering space may be observed, and the movement of the received AR object may be expressed in one or more ways depending on the configuration and implementation of the service.

For example, As an example, the rendering window may be regarded as a fixed window through which the rendering space may be observed. Here, in the case that the received AR object moves and is out of the viewing range of the rendering window, it may not be displayed on the user's AR glasses.

As another example, the rendering window may be regarded as a movable window capable of observing the rendering space, and in this case, the movement of the received AR object may be continuously observed by moving the rendering window. That is, it is possible to provide an experience similar to reproducing a video captured while moving a camera in the content reproduced on a 2D display such as a TV or a smartphone.

Figure 4:
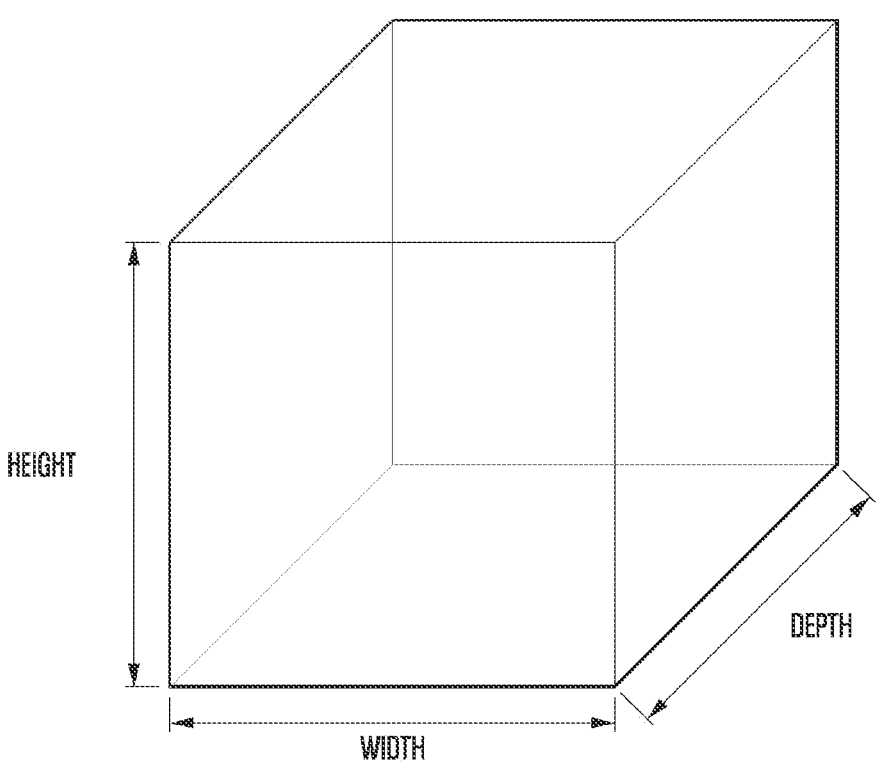
FIG. 4 is a diagram for explaining a 3D space for expressing a rendering space and a rendering window.

FIG. 4 is a diagram for explaining a 3D space for expressing a rendering space and a rendering window.

As illustrated in FIG. 4, the rendering space and the rendering window may be expressed as a three-dimensional space. The 3D space may have various shapes such as a rectangular parallelepiped, a cylinder, and a cone. However, for convenience of description, a 3D space in the form of a rectangular parallelepiped shape as illustrated in FIG. 4 will be described below.

With reference to FIG. 4, the rectangular parallelepiped-shaped 3D space may be defined by the lengths of three edges, width, height, and depth, and the lengths of the edges may be theoretically from a value of 0 to an infinite value. For example, in the case that AR glasses are used outdoors, the height of the rendering space may have an infinite value. As another example, in the case that the received AR object is rendered like a 2D content in a frame-shaped rendering window, the depth of the rendering window may have a value of 0.

Figure 5:
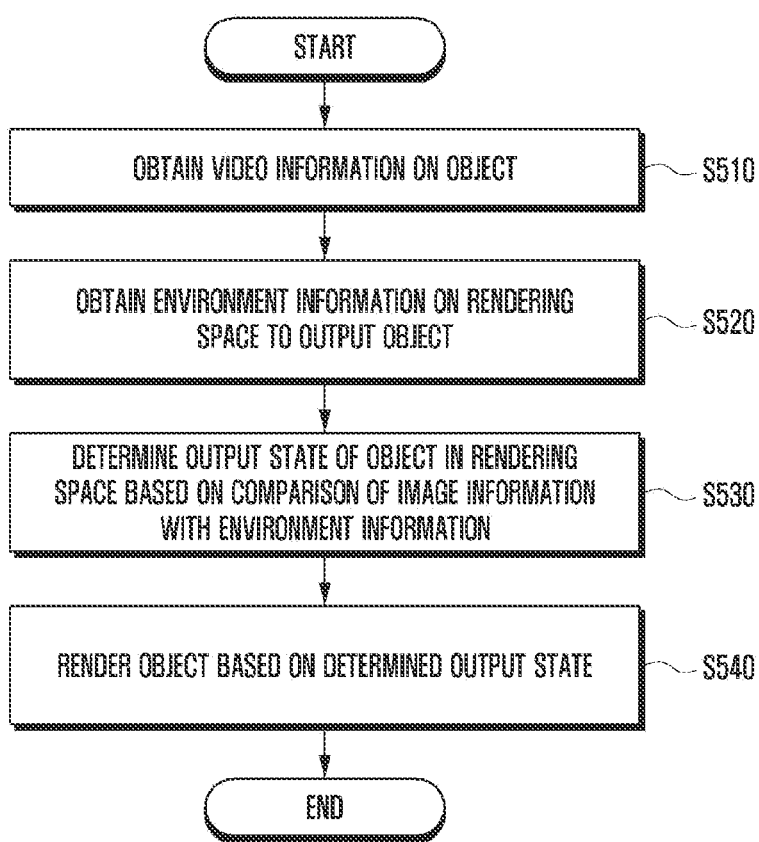
FIG. 5 is a flowchart illustrating an operation of performing rendering by a device according to an embodiment of the invention.

FIG. 5 is a flowchart illustrating an operation of performing rendering by a device according to an embodiment of the disclosure.

With reference to FIG. 5, a device according to an embodiment of the disclosure may acquire image information on an object (S510).

For example, as described above with reference to FIGS. 2*a* and 2*b*, a user device performing rendering may acquire information on a target object to be rendered from a content server or obtain video information on an object generated from another user device. As an example, video information on an object may be capturing information on a predetermined space including the object or the size of the object. Description in this regard will be provided later.

In addition, the user device according to an embodiment of the disclosure may obtain environment information on a rendering space (space) in which an object is to be output. As described above in FIG. 3, the rendering space is a space where the user is currently located, and environment information thereof includes the size of a target space to output an object, the user's position here, and user pose information such as the direction of the user's view point. In addition, it may include information on an object such as an obstacle (information on size, position, range of movement, etc.) within the configured rendering space. Such information may be obtained through a sensing unit of the user device itself or may be obtained from a database.

Thereafter, the user device according to an embodiment of the disclosure may determine an output state to output an object in the rendering space based on the comparison of video information with environment information (S530).

For example, the size of the capturing space when an object is captured for the generation of video information and information on the size of the object relative thereto are compared with the size of the space to be rendered and the user's position or viewpoint direction in the space to be rendered, and thus, the output state may be determined so that the object is output according to an appropriate position and an appropriate ratio within the rendering space. To this end, the user device according to an embodiment of the disclosure may appropriately scale the output size of the object to the size of the rendering space.

According to the output state determined in this way, the object may be rendered (S540).

For example, the user device according to an embodiment of the disclosure may render the object at an appropriate location within the display in consideration of the determined rendering window.

Meanwhile, the rendering space and the rendering window are spaces in which a received object may be rendered in the AR glasses, and may also affect the generation of an AR content. For example, As an example, as illustrated in FIG. 2b, when UE1 and UE2 use an AR call service, UE1 and UE2 may mutually exchange information on the rendering space/rendering window. Here, if UE2 learns information that the rendering space of UE1 is narrower than the capturing space of UE2, the capturing space of UE2 may be reduced to match the rendering space of UE1. Further, additionally, UE1 may transfer to UE2 the rendering space and the resolution at which the rendering space is expressed on the display of the AR glasses of UE1, and UE2 may utilize this information to configure encoding parameters of an AR object.

Hereinafter, detailed descriptions of a capturing operation for generating video information on an object and a space to be captured (capturing space) including the object will be described.

A space capable of capturing a content including an AR object may be defined as a capturing space. The capturing may include an operation of modeling an AR object using information obtained from one or more cameras. Accordingly, the capturing space may be determined by a field of view(FoV) of a camera, an arrangement of cameras, and a surrounding environment.

Figure 6A:
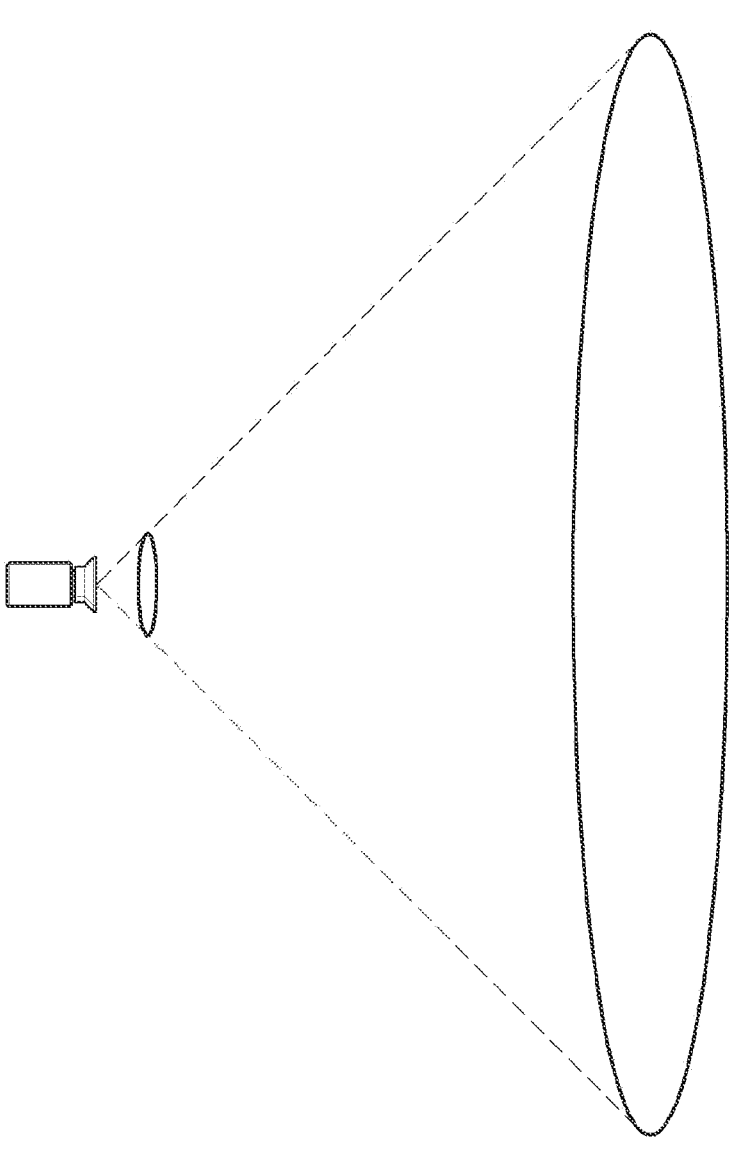
FIG. 6a is a diagram for explaining a method for determining a capturing space.
Figure 6B:
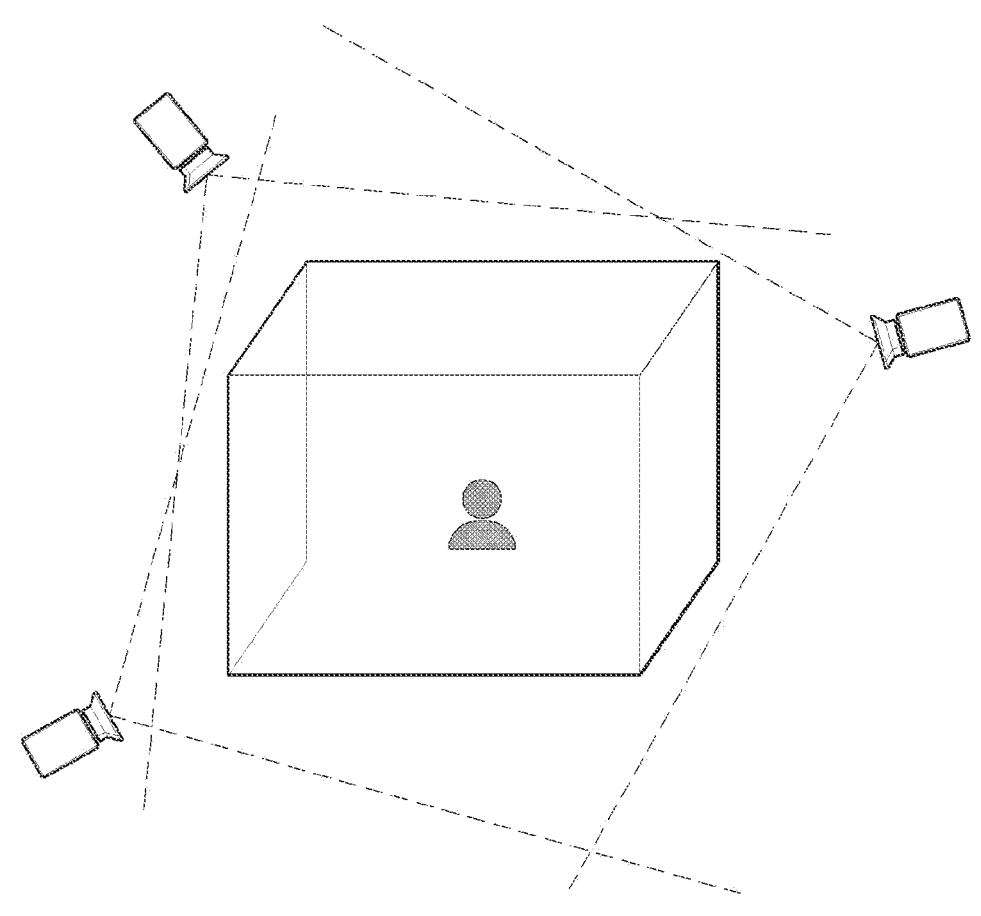
FIG. 6b is a diagram for explaining a method for determining a capturing space.

FIGS. 6a and 6b are diagrams for explaining a method for determining a capturing space.

FIG. 6a illustrates a method for determining a capturing space using one camera, and FIG. 6b illustrates a method for determining a capturing space using three cameras.

With reference to FIG. 6a, in the case that a video is acquired by a single camera, a capturing space may have a frustum shape determined by a viewing angle of the camera. In the case of indoors, the wide surface of the frustum may have limitations due to structures such as walls and ceilings, and in the case of outdoors, it may theoretically have an infinite area.

With reference to FIG. 6b, in the case that videos are acquired with three cameras, the capturing space may have a polyhedral shape defined by the viewing angles and arrangements of the three cameras. However, in FIG. 6b, an example in which the capturing space has the shape of a rectangular parallelepiped is illustrated. As described in the description of the rendering space, the capturing space may also have various forms, but for convenience of description, a rectangular parallelepiped-shaped 3D space as illustrated in FIG. 6b will be described below.

The A maximum capturing space is a space constituted by viewing angles and arrangement of cameras and a user environment such as indoors/outdoors, and means a maximum space in which an object can be captured. That is, objects outside the maximum capturing space cannot be captured. A static capturing space and a dynamic capturing space, which will be described later, are all or part of the maximum capturing space and may be selected by a user according to characteristics of a service or an object to be captured.

The static capturing space is a fixed space in which objects can be captured by one or more cameras, and may include all or part of the maximum capturing space. In the case that the static capturing space is used, an object moving within the static capturing space may be captured, and in the case that the object moves out of the static capturing space, capturing may not be possible. As an example, in the case that capturing is performed in an indoor studio, cameras are arranged to capture all objects inside the studio, and the static capturing space may coincide with the maximum capturing space. Here, since the static capturing space is fixed in the absolute coordinate system, the motion of the object may be expressed as a change in relative coordinates based on a point in the studio.

The dynamic capturing space is a space in which an object can be captured by one or more cameras, which includes a portion of the maximum capturing space and may move within the maximum capturing space overtime. In the case that the dynamic capturing space is used, an object moving within the maximum capturing space may be captured, and capturing may not be possible in the case that the object moves beyond the maximum capturing space. As an example, in the case that a marathon is relayed, the dynamic capturing space that moves according to a specific runner may be configured. Here, since the dynamic capturing space is moving in an absolute coordinate system, the motion of the object may be expressed as a coordinate movement of the dynamic capturing space itself and a change in relative coordinates based on a point in the dynamic capturing space.

The static capturing space and the dynamic capturing space may be expressed as a 3D space in various forms such as a rectangular parallelepiped, a cylinder, a cone, etc., but for convenience of explanation, a rectangular parallelepiped-shaped 3D space as illustrated in FIG. 4 is considered as the static capturing space and the dynamic capturing space. That is, as described above with reference to FIG. 4, the rectangular parallelepiped-shaped 3D space may be defined by the length of three edges, width, height, and depth and the length of the edges may theoretically have a value of 0 to an infinite value. As an example, in the case that an object is captured using a single camera outdoors, the depth of the static/dynamic capturing space may theoretically have an infinite value. The actual capturing space may range from several tens of centimeter to several tens of meters depending on the resolution of an AR content and the optical resolution of the camera.

An AR object is expressed in a format such as polygon file format(PLY), and points, lines, and planes constituting the object may be expressed using a three-dimensional coordinate system. Here, the coordinate system representing the AR object included in the PLY file is a relative coordinate system based on an origin (X=0, Y=0, Z=0), and information on which position the origin corresponds to on actual coordinates may be transferred as application level information such as scene description. In the case that one service uses the static capturing space, if the origin of the static capturing space and the origin of the PLY file are configured to coincide, information on the origin is transferred to a renderer only once during a service initialization process to provide the service. In addition, even in the case that one service uses the dynamic capturing space, if the origin of the dynamic capturing space and the origin of the PLY file are configured to coincide, the change of the origin of the PLY file and the change of the origin of the dynamic capturing space may be transferred to the renderer using one mechanism.

As described above, since a device performing rendering uses video information (information on a capturing space) of the object acquired from other devices/servers in rendering the object, the rendering space/window and the static/dynamic capturing space are configured in different terminals, but may affect each other depending on service. Hereinafter, their relationship will be described through examples.

For example, a case in which user A located in a conference room and user B located at home use an AR video call service may be considered. Here, assuming that the conference room of user A is wider than the living room of user B, if user A and user B do not mutually exchange information on the static/dynamic capturing space and the rendering space/window, when the movement of user A exceeds the living room range of user B, a malfunction such as moving user A beyond the wall may occur. In consideration of this, in the AR video call service according to an embodiment of the disclosure, user A and user B may operate to mutually exchange information on the static/dynamic capturing space and the rendering space/window. In this case, the user A's static capturing space may correspond to the entire conference room, and the user B's rendering space may correspond to the living room.

More specifically, in the first step of the AR video call service, when user A requests an AR call to user B, user A may send information on the user A's static capturing space together. After user B's AR glasses recognize that user A's static capturing space is wider than user B's rendering space, several operations may be selectively performed depending on the implementation.

As an example, the user B's AR glasses may perform rendering by scaling the AR object at the ratio of the user A's static capturing space and the user B's rendering space. (For example, the size of the object may be halved, reduce, and a movement of 1 m of an object is expressed as a movement of 50 cm).

Also, as an example, user B may request user A to adjust the user A's capturing space based on the user B's rendering space. Here, the user A's AR glasses displays a space corresponding to the user B's rendering space as a virtual line in the user A's environment, induce user A not to cross the line, and control to generate video information.

Next, a case in which user A located in a conference room and user B located in a street use an AR video call service may be considered. In the AR video call service according to an embodiment of the disclosure, user A and user B may mutually exchange information on the static/dynamic capturing space and the rendering space/window. In the first step of the AR video call service, when user A requests an AR call to user B, user A may transmit information on the user A's static capturing space together. Here, the user B's AR glasses configures the rendering window so that it does not interfere with walking (i.e., the received object can be displayed in an area free of obstacles) and requests that user A use the dynamic capturing space.

To this end, information on the static/dynamic capturing space and the rendering space/window for the AR video call may be exchanged between users using session description protocol(SDP). A typical video call procedure is as follows.

1: A caller transfers signaling information including media parameters for video and audio to be transmitted/received to a callee using SDP. This is called an SDP Offer.

The parameter includes codec information, video resolution, or the like, and may include a plurality of configuration information for one media.

2: The receiver selects the configuration information to be finally used in consideration of the processing capability of the receiver's terminal among the configuration information of media parameters provided through the SDP Offer, and transfers it to the caller using SDP. This is called an SDP Answer, and the SDP Answer may include configuration information not included in the SDP Offer.

3: The caller receiving the SDP Answer initiates a call in the case that the final configuration information is agreed upon, and performs steps 1 and 2 above again in the case that the caller wishes to renegotiate by revising the SDP Answer again.

In the case that media parameters need to be changed during a call, re-negotiation of Steps 1, 2, and 3 as above may be performed or real-time transport control protocol (RTCP) may be used. In general, parameters affecting the processing capability of a terminal, network capacity, or the like are exchanged through renegotiation, and other dynamically changeable parameters may be exchanged using RTCP.

Hereinafter, attributes of SDP in an AR call according to an embodiment of the disclosure will be described. The SDP according to an embodiment of the disclosure may include the following attributes as media parameters for exchanging AR objects.

a=RenSP: <Ren-type> <unit> <x, y, z> <w, h>
<Ren-type>=space/window
<unit>=cm/m

In <Ren-type>, space means the rendering space, window means the rendering window, and <unit> means expressing <x, y, z> in units of centimeter (cm) or meter (m). In <x, y, z>, as illustrated in FIG. 4, x means a width, y means a height, and z means a depth, and <w, h> represents the number of horizontal (w) and vertical (h) pixels in which the corresponding rendering space/window are represented on the display, respectively.

a=CapSP: <Cap-type> <unit> <x, y, z>
<Cap-type>=static/dynamic
<unit>=cm/m

In <Cap-type>, static means to use the static capturing space, dynamic means to use the dynamic capturing space, and <unit> means expresses <x, y, z> in units of centimeters (cm) or meters (m). In <x, y, z>, as illustrated in FIG. 4, x means a width, y means a height, and z means a depth.

In the SDP Offer of an AR call according to an embodiment of the disclosure, <Cap-type> of a calling terminal may be suggested in plural, and <Ren-type> of a receiving terminal may also be suggested. Also, in the initial SDP Offer, RenSP's<w, h> and CapSP's<x, y, z> corresponding to the receiving terminal can all be offered with a value of 0, and the actual value is added when the receiving terminal generates the SDP answer.

The receiving terminal may optimize encoder parameters such as bit rate by utilizing <x, y, z>, <w, h> values included in the RenSP attribute of the calling terminal included in the SDP Offer.

Meanwhile, parameters included in the a=RenSP and a=CapSP attributes described above may be changed in the middle of a call session using an RTCP feedback message, an HTTP Restful API, or the like.

In the above-described specific embodiments of the disclosure, a component included in the disclosure is expressed in a singular or plural form depending on a presented embodiment of the disclosure. However, singular or plural expressions are selected to be suitable for situations presented for convenience of description, and the disclosure is not limited to the singular or plural form. A component expressed in a plural form may be constituted as a single component, or a component expressed in a singular form may be configured as a plurality of components.

Although certain embodiments have been described in the detailed description of the disclosure, various modifications may be made without departing from the scope of the disclosure. Therefore, the scope of the disclosure should not be limited to the above-described embodiments of the disclosure and should be determined by the appended claims and the equivalents thereof.

The invention claimed is:

1. A method performed by a user equipment (UE) for rendering an object sent from another UE in a wireless communication system, the method comprising:

obtaining video information on a capturing space of the another UE;

obtaining environment information on a rendering space in which the object is to be output;

determining an output state of the object in the rendering space based on a comparison between the video information and the environment information; and rendering the object based on the determined output state by scaling the object at a size ratio of the capturing space and the rendering space, wherein the video information is sent from the another UE during a video call connection establishment and includes the object configured with a parameter based on an output resolution of the UE.

2. The method of claim 1, wherein the video information includes a size of the object, and wherein the environment information includes information on a size of the rendering space and a position of the UE in the rendering space.

3. The method of claim 2, wherein determining the output state of the object comprises determining an output size of the object based on a comparison between a size of the capturing space and the size of the rendering space.

4. The method of claim 1, further comprising:

transmitting, to the another UE, the environment information on the rendering space in which the object is to be output.

5. The method of claim 1, further comprising:

transmitting to the another UE, information on the output resolution of the UE.

6. The method of claim 4, further comprising:

requesting, to the another UE, update of the video information based on the environment information.

7. A user equipment (UE) for rendering an object sent from another UE in a wireless communication system, the UE comprising:

a communication unit;

an output unit; and a controller configured to:

control the communication unit to obtain video information on a capturing space of the another UE, obtain environment information on a rendering space in which the object is to be output, determine an output state of the object in the rendering space based on a comparison between the video information and the environment information, and control the output unit to render the object based on the determined output state by scaling the object at a size ratio of the capturing space and the rendering space, wherein the video information is sent from the another UE during a video call connection establishment and includes the object configured with a parameter based on an output resolution of the UE.

8. The UE of claim 7, further comprising:

a sensing unit to obtain the environment information, wherein the video information includes a size of the object, and wherein the environment information includes information on a size of the rendering space and a position of the UE in the rendering space.

9. The UE of claim 8, wherein the controller is further configured to determine the output state of the object based on a comparison between a size of the capturing space and the size of the rendering space.

10. The UE of claim 7, wherein the controller is further configured to control the communication unit to transmit, to the another UE, the environment information on the rendering space in which the object is to be output.

11. The UE of claim 7, wherein the controller is further configured to control the communication unit to transmit, to the another UE, information on the output resolution of the UE.

12. The UE of claim 10, wherein the controller is further configured to request update of the video information to the another UE based on the environment information.

\* \* \* \* \*